Figures 1, 2, 3:
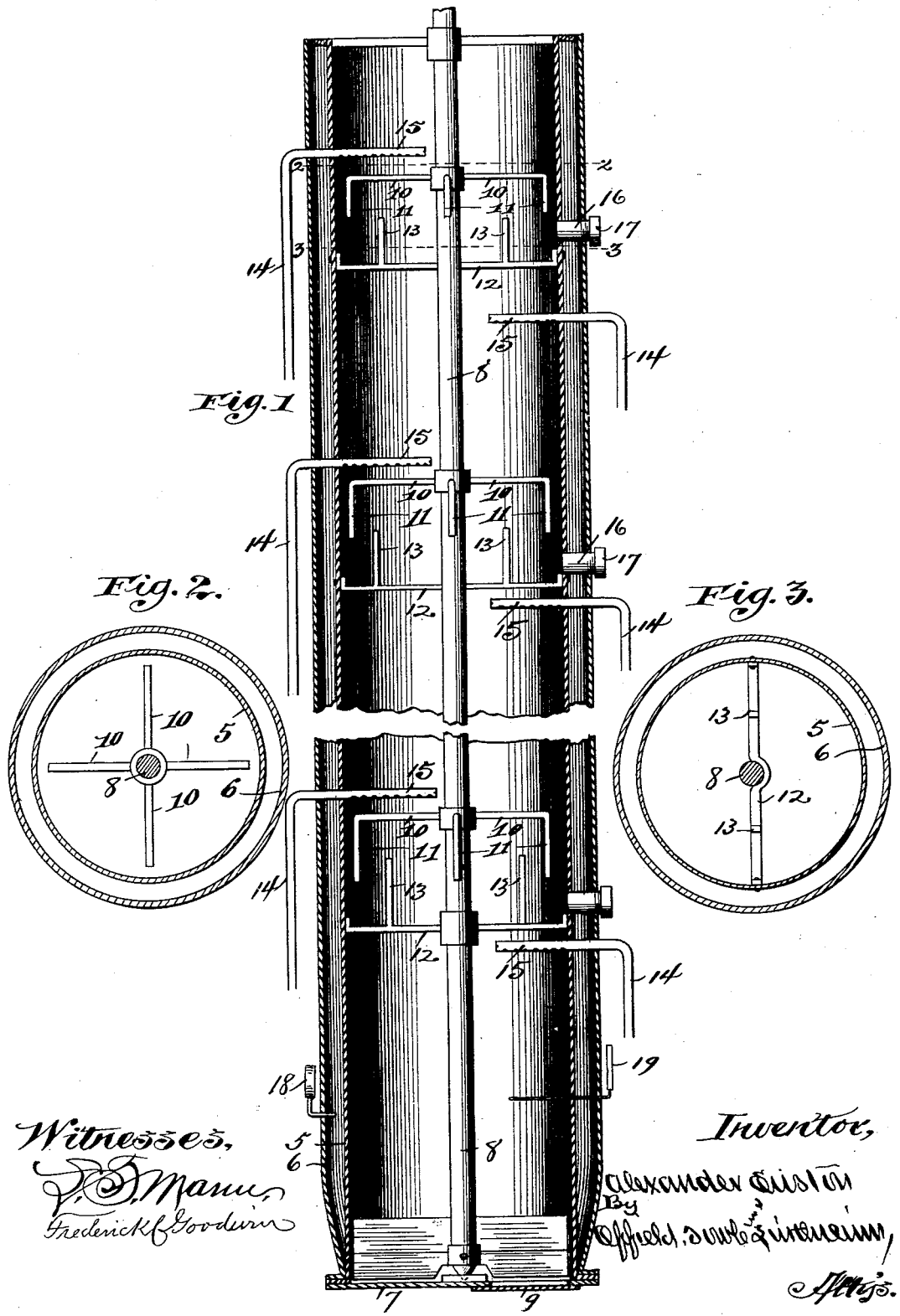

(No Model.)

A. EUSTON.
APPARATUS FOR TREATING OLEAGINOUS SEEDS.

No. 587,802. Patented Aug. 10, 1897.

Witnesses,
Inventor,
Alexander Euston

UNITED STATES PATENT OFFICE.

ALEXANDER EUSTON, OF ST. LOUIS, MISSOURI.

APPARATUS FOR TREATING OLEAGINOUS SEEDS.

SPECIFICATION forming part of Letters Patent No. 587,802, dated August 10, 1897.

Application filed November 14, 1895. Serial No. 568,882. (No model.)

*To all whom it may concern:*

Be it known that I, ALEXANDER EUSTON, of St. Louis, Missouri, have invented certain new and useful Improvements in Apparatus for Treating Flax and other Oleaginous Seeds, of which the following is a specification.

In the treatment of oleaginous seeds and especially flaxseed for the extraction of oil the seeds are first crushed between heavy rolls for the purpose of rupturing the cells or sacs containing the oil, and then this crushed mass is subjected to heat and agitation in a shallow heater consisting of a steam-jacketed cylinder having a revolving rake which sweeps through the mass and forces it out through an opening in the side of the cylinder. The mass, after being subjected to heat and agitation, is formed in molds and subsequently transferred to a hydraulic press for the purpose of expressing the oil and forming the article known as "oil-cake." This method of treatment is defective in some particulars, and these defects it is the object of my invention to remedy. The principal defect may be stated as follows: The crushed seeds or meal is usually fed by gravity into the heater at its top, and the heater-tank is kept, say, two-thirds full. The rake is arranged to sweep through this mass and gradually works it out through the discharge-opening in the side of the tank; but the mass of meal moves horizontally, and hence there is no intimate mixture of the mass from bottom to top, so that it is practically treated and discharged in layers, resulting in great lack of uniformity in the treatment, and a considerable percentage of the meal is not tempered at all, producing in consequence a smaller amount of oil when subjected to treatment by the hydraulic press.

My invention consists in an improved construction of heater in which the seeds or meal is thoroughly commingled, uniformly tempered, and an increased yield of oil is assured.

My improved heater comprises a jacketed cylinder, which is made of much greater vertical height in proportion to its transverse diameter than heretofore, of a series of rakes, stirrers, or agitators, of any convenient form, and means for delivering into the mass at different heights water, steam, or air for the purpose of securing an even temper of the mass. I also provide certain accessories in the way of test apparatus and extend the pipes or conduits for the tempering agents to the bottom of the machine, so as to place each one separately under the control of an attendant.

In the accompanying drawings, Figure 1 is a broken vertical sectional elevation through the jacketed cylinder, forming the body of the machine and showing in elevation, partly broken away, the rake-shaft, rakes, and certain braces and test-tubes. Figs. 2 and 3 are transverse sections on corresponding lines of Fig. 1.

In the drawings, 5 represents the inner shell, and 6 the outer shell, of a jacketed cylinder, which for practical purposes may be sixteen feet in height and two feet in interior diameter. The space between these shells contains the heating medium, either steam or hot water. The upper end of the cylinder may be open. The lower end is closed by a base-plate 7, having a step-bearing to receive the central rake-shaft 8. In the bottom plate is provided a delivery-aperture for a sliding valve or cover 9. Upon the rake-shaft are mounted a series of rakes which in the form shown comprise four radial arms 10, having downwardly-turned extremities 11. These are secured to hubs fixed on the shaft and turn therewith. As shown in the drawings, three sets of these rakes are employed, but it may be found expedient to increase that number. Below each set of rakes there is provided an arm or cross-piece 12, serving as a brace to the interior shell and having upstanding arms 13, which serve as arresting-points to divide the mass of meal or crushed seed under treatment and co-operating with the rakes to effect the intimate commingling and agitation thereof.

14 represents pipes extending up externally of the cylinder and having inturned ends 15, piercing both shells and projecting into the working space of the interior shell. These pipes are intended to deliver air or steam into the mass for the purpose of tempering it while undergoing treatment. It may be found expedient at times to deliver steam through the upper pipes and at the same time to deliver air through the lower pipes, or steam may be delivered to any of the series of pipes, the proper connections being made according to the condition of the crushed seed under treatment. Frequently it is found that the seed is too dry for proper tempering, and hence it will be found necessary to inject steam. In other cases it may be found that the seed is too damp and the treatment with hot air will be employed. These pipes all preferably extend to the base of the machine, where they may be adapted for connection to a source of supply of steam or air either separately or interchangeably.

At certain points I prefer to apply tubes 16, which pierce the shells and are closed at their outer ends by screw-caps 17, and through these tubes may be inserted a proper instrument for determining the temperature. At 18 is indicated a steam-gage, and at 19 a thermometer for indicating the temperature of the seed near the point of discharge.

In the operation of this apparatus the cylinder being filled to any convenient height with the crushed seed or meal and the central shaft being put in motion the whole mass is agitated, and as it moves downwardly in the cylinder, receiving fresh accretions at the top, while the finished product is being drawn from the bottom, the mass is thoroughly agitated by the succession of rakes and thoroughly tempered, so that each particle of the mass is subjected to a uniform treatment.

The chief advantage of this apparatus over the apparatus previously in use is that instead of the crushed seed being discharged from the heater near the point of inlet, and usually within two feet, and instead of being moved *en masse* horizontally around and out of the heater, the whole mass has a vertical movement through a considerable distance, say twelve feet or more, as well as a horizontal motion due to the action of the revolving rakes, and a more uniform tempering under the control of the attendant and a higher average yield of oil is secured.

While I do not confine my invention to the precise structural details nor to the exact proportions shown, I believe those above given to be approximately the best for practical use.

I claim—

1. An apparatus to be used in the treatment of oleaginous seeds, comprising in combination a vertically-arranged steam-jacketed cylinder whose height exceeds its transverse diameter, a centrally-mounted rotating shaft extending through the working space of the cylinder, a series of rakes or agitators mounted upon and turning with said shaft and a series of pipes projecting into the working space at suitable intervals for introducing a tempering or modifying medium, substantially as described.

2. In an apparatus to be used in treating oleaginous seeds the combination with a vertically-arranged steam-jacketed cylinder having a feed-opening in its upper portion and a discharge-opening in its lower portion, said cylinder having a vertical height greatly in excess of its diameter, a centrally-mounted rotating shaft extending through the working space of the cylinder, a series of rakes or agitators mounted upon and turning with said shaft and whereby a stream of material is caused to move continuously through said chamber from the inlet to the discharge opening and means for introducing into the working spaces of the cylinder a tempering or modifying medium at suitable elevations, substantially as described.

3. In an apparatus of the class described, the combination with a steam-jacketed cylinder having a vertical height greatly in excess of its transverse diameter, agitators, pipes for delivering a tempering or modifying medium to the working space at different heights and test-tubes piercing the walls of the jacketed cylinder for testing the condition of the mass at different altitudes, substantially as described.

ALEXANDER EUSTON.

Witnesses:
L. F. McCREA,
N. M. BOND.